US012636607B2

(12) United States Patent
Ngo et al.

(10) Patent No.: US 12,636,607 B2
(45) Date of Patent: May 26, 2026

(54) PROCESSES AND APPARATUSES FOR REDUCING MOLECULAR WEIGHT FLUCTUATION IN A TAIL GAS STREAM FROM A PRESSURE SWING ADSORPTION PROCESS

(71) Applicant: UOP LLC, Des Plaines, IL (US)

(72) Inventors: Anh Ngo, Carol Stream, IL (US); Shubhra J. Bhadra, Naperville, IL (US); Garrett Lukin, Seatle, WA (US); William Cady, Chicago, IL (US); Nasser Khazeni, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 344 days.

(21) Appl. No.: 18/543,951

(22) Filed: Dec. 18, 2023

(65) Prior Publication Data

US 2025/0196053 A1     Jun. 19, 2025

(51) Int. Cl.
   B01D 53/047 (2006.01)

(52) U.S. Cl.
   CPC ...... *B01D 53/047* (2013.01); *B01D 2253/102* (2013.01); *B01D 2253/104* (2013.01); *B01D 2253/106* (2013.01); *B01D 2256/16* (2013.01); *B01D 2257/702* (2013.01); *B01D 2259/40007* (2013.01); *B01D 2259/40013* (2013.01); *B01D 2259/4003* (2013.01); *B01D 2259/40043* (2013.01); *B01D 2259/40064* (2013.01); *B01D 2259/40079* (2013.01); *B01D 2259/40081* (2013.01); *B01D 2259/404* (2013.01)

(58) Field of Classification Search
   CPC .................. B01D 53/047; B01D 53/04; B01D 2253/102; B01D 2253/104; B01D 2253/106; B01D 2256/16; B01D 2257/702; B01D 2259/40007; B01D 2259/40013; B01D 2259/4003; B01D 2259/40043; B01D 2259/40064; B01D 2259/40079; B01D 2259/40081; B01D 2259/404
   USPC ...................................... 95/1, 8, 96
   See application file for complete search history.

(56) References Cited

U.S. PATENT DOCUMENTS

| | | | |
|---|---|---|---|
| 6,010,555 A | 1/2000 | Smolarek et al. | |
| 8,545,601 B2 | 10/2013 | Song | |
| 8,702,840 B1 * | 4/2014 | Friedman | B01D 53/02 95/19 |
| 9,034,079 B2 | 5/2015 | Deckman et al. | |

(Continued)

FOREIGN PATENT DOCUMENTS

| | | |
|---|---|---|
| CN | 211799850 U | 10/2020 |
| CN | 113247861 A | 8/2021 |

(Continued)

OTHER PUBLICATIONS

Machine-generated English translation of JP 2012-215376A, published Nov. 8, 2012.*

(Continued)

*Primary Examiner* — Frank M Lawrence, Jr.

(57) ABSTRACT

Processes and apparatuses for reducing molecular weight fluctuation in a tail gas stream from a pressure swing adsorption process. Multiple PSA separation zone are synchronized such that when one of the PSA units is generating a low molecular weight tail gas, there is another PSA unit generating a high molecular weight tail gas.

20 Claims, 2 Drawing Sheets

(56) References Cited

U.S. PATENT DOCUMENTS

Figure 1:
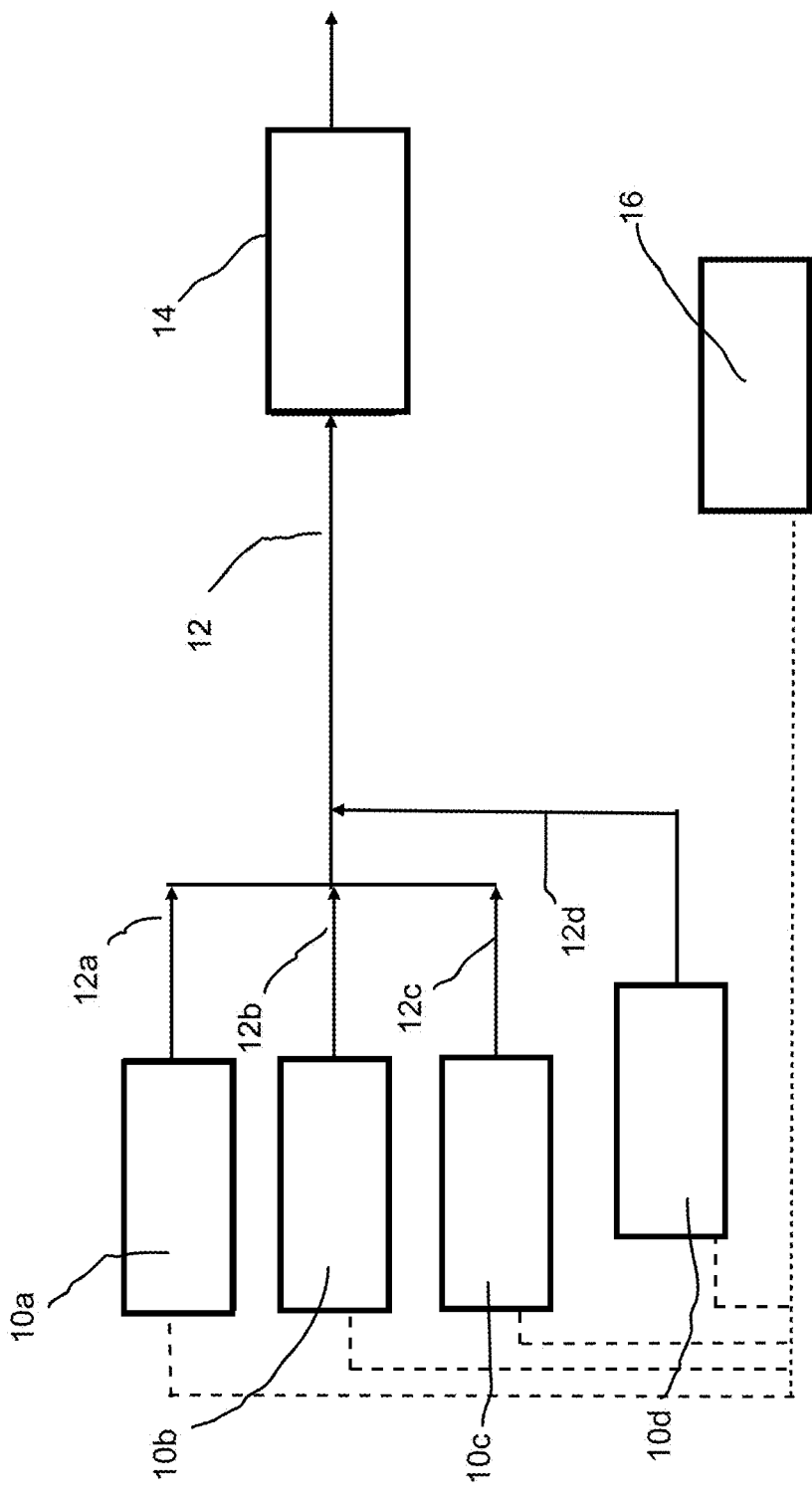

| | | | | |
|---|---|---|---|---|
| 10,632,415 B2* | 4/2020 | Rautiainen | ........... | B01D 53/047 |
| 10,730,006 B2 | 8/2020 | Wagner et al. | | |
| 11,167,240 B2 | 11/2021 | D'Addio et al. | | |
| 2004/0211414 A1* | 10/2004 | Cantrill | .............. | B01D 53/0446 |
| | | | | 128/202.26 |
| 2006/0130651 A1 | 6/2006 | Bizjak | | |
| 2015/0143993 A1 | 5/2015 | Renou et al. | | |
| 2016/0250580 A1 | 9/2016 | Monereau et al. | | |
| 2023/0191311 A1 | 6/2023 | Russell et al. | | |

FOREIGN PATENT DOCUMENTS

| | | | |
|---|---|---|---|
| EP | 1228799 A1 | | 8/2002 |
| JP | 2012215376 A | * | 11/2012 |

OTHER PUBLICATIONS

A. Marcinek et al., Process intensification of the high-purity nitrogen production in twin-bed Pressure Swing Adsorption plants, Adsorption (2021) 27:937-952.

Johanna Schell et al., Precombustion $CO_2$ Capture by Pressure Swing Adsorption (PSA): Comparison of Laboratory PSA Experiments and Simulations, Ind. Eng. Chem. Res. 2013, 52, 8311-8322.

Naef A.A. Qasem et al., Energy and productivity efficient vacuum pressure swing adsorption process to separate $CO_2$ from $CO_2/N_2$ mixture using Mg-MOF-74: A CFD simulation, Applied Energy 209 (2018) 190-202.

International Search Report from corresponding PCT application No. PCT/US2024/058795, mailed Apr. 2, 2025.

Written Opinion from corresponding PCT application No. PCT/US2024/058795, mailed Apr. 2, 2025.

* cited by examiner

PROCESSES AND APPARATUSES FOR REDUCING MOLECULAR WEIGHT FLUCTUATION IN A TAIL GAS STREAM FROM A PRESSURE SWING ADSORPTION PROCESS

FIELD OF THE INVENTION

This invention relates generally to pressure swing adsorption process and more specifically to processes for reducing molecular weight fluctuation in a tail gas stream from a pressure swing adsorption process.

BACKGROUND OF THE INVENTION

A centrifugal gas compressor provides efficiency, cost, and scalability advantages compared to other types of gas compressors, such as oil-flooded screw compressors, for large gas flow rates. This type of compressor may be used for compression of a tail gas stream in pressure swing adsorption (PSA) unit in, for example, steam methane reforming (SMR) or ATR hydrogen plants, gasification processes, steel plant (blast furnace) off gas, etc.

While effective for their intended purpose, one disadvantage associated with centrifugal gas compressors is their sensitivity to dynamic fluctuations in gas density. This may impact their ability to effectively and efficiently be utilized in configurations with varying gas compositions. One such contemplated configuration is with a PSA unit in which the PSA tail gas has variations of composition/molecular weight during the cycling and transitions between operating modes.

A PSA unit generally includes four or more adsorption vessels, and each vessel includes a plurality of adsorbent layers. In the PSA unit, a multicomponent gas is typically fed to at least one of a plurality of adsorption beds at an elevated pressure effective to adsorb at least one component, while at least one other component passes through. At a defined time, feed to the adsorber is terminated and the bed is depressurized by one or more co-current depressurization steps wherein pressure is reduced to a defined level which permits the separated, less-strongly adsorbed component or components remaining in the bed to be drawn off without significant concentration of the more-strongly adsorbed components. Then, the bed is depressurized by a counter-current depressurization step wherein the pressure on the bed is further reduced by withdrawing desorbed gas counter-currently to the direction of feed. Finally, the bed is purged and repressurized. The final stage of re-pressurization is with product gas or feed gas. Accordingly, the tail gas stream from the PSA unit is constantly changing in composition and flow rate. Tail gas mixing tanks are typically used to dampen composition and flow rate variations, but significant variation still remains downstream of the mixing tank.

Therefore, it would be desirable to provide processes which effectively and efficiently reduce the fluctuations of the PSA tail gas.

SUMMARY OF THE INVENTION

The present invention provides processes which reduce the fluctuation of molecular weight of a PSA tail gas, thus offer more efficient and stable compression, reduce power consumption, and better stability to downstream process. In the present processes, multiple PSA units, each with cycling beds, are synchronized so that one PSA unit is producing a high molecular weight tail gas, while another is producing a lower molecular weight tail gas. The tail gases are combined, thereby reducing the fluctuation of the average molecular weight.

Therefore, the present invention may be characterized, in at least one aspect, as providing a method for reducing molecular weight fluctuation in a tail gas stream from a pressure swing adsorption process by: providing a first PSA separation zone comprising a plurality of vessels each containing an adsorbent configured to adsorb a species from a multi-component feed and provide a product stream, and a first tail gas stream by cycling through a first plurality of steps, wherein a molecular weight of the first tail gas stream fluctuates between a high molecular weight and a low molecular weight; providing a second PSA separation zone a second plurality of vessels each containing an adsorbent configured to adsorb a species from a multi-component feed and provide a product stream, and a second tail gas stream by cycling through a second plurality of steps, wherein a molecular weight of the second tail gas stream fluctuates between a high molecular weight and a low molecular weight; and, synchronizing the first plurality of steps with the second plurality of steps so that when the first tail gas stream has a high molecular weight, the second tail gas stream has a low molecular weight.

The first plurality of steps may be synchronized with the second plurality of steps so that when the first tail gas stream has a low molecular weight, the second tail gas stream has a high molecular weight.

The synchronizing may include a controller for the first PSA separation zone sending a signal to a controller for a second PSA separation zone. The signal may relate to a current step a vessel of the first PSA separation zone. The signal may relate to a future step a vessel of the first PSA separation zone. The signal may include an instruction for the second PSA separation zone to start a vessel of on a specific step.

The first and second plurality of steps may include: an adsorption step, a co-current depressurization step, a counter-current depressurization step, a purge step, and a repressurization step.

The method may further include combining the first tail gas stream and the second tail gas stream to provide a net tail gas stream. The method may also include compressing the net tail gas stream in a compression zone. The compression zone may have at least one compressor.

In another aspect, the present invention may be generally characterized as providing a method for reducing molecular weight fluctuation in a tail gas stream from a pressure swing adsorption process by: operating a plurality of PSA separation zones to adsorb a species from a multi-component feed, wherein each PSA separation zone comprises a plurality of vessels each containing an adsorbent configured by cycling through a plurality of steps, wherein each PSA separation zone provides a product stream and a tail gas stream, and wherein a molecular weight of the tail gas stream fluctuates between a high molecular weight and a low molecular weight; combining the tail gas streams from each PSA separation zone to form a net tail gas stream; and controlling each PSA separation zone such that when a tail gas stream from a first PSA separation zone has a high molecular weight, a tail gas stream from a second PSA separation zone has a low molecular weight.

The controlling may include a controller for the first PSA separation zone sending a signal to a controller for the second PSA separation zone. The signal may relate to a current step a vessel of the first PSA separation zone. The signal may relate to a future step a vessel of the first PSA separation zone. The signal may be an instruction for the second PSA separation zone to start a vessel on a specific step.

The plurality of steps may include an adsorption step, a co-current depressurization step, a counter-current depressurization step, a purge step, and a repressurization step.

The method may also include compressing the net tail gas stream in a compression zone. The compression zone has at least one compressor.

The present invention may also be characterized as providing a method for reducing molecular weight fluctuation in a tail gas stream from a pressure swing adsorption process by: operating a plurality of PSA separation zones to adsorb a species from a multi-component feed, wherein each PSA separation zone comprises a plurality of vessels each containing an adsorbent configured by cycling through a plurality of steps, wherein each PSA separation zone provides a product stream and a tail gas stream, and wherein a molecular weight of the tail gas stream fluctuates between a high molecular weight and a low molecular weight, and wherein the plurality of steps comprise: an adsorption step, a co-current depressurization step, a counter-current depressurization step, a purge step, and a repressurization step; combining the tail gas streams from each PSA separation zone to form a net tail gas stream; and controlling each PSA separation zone such that when a tail gas stream from a first PSA separation zone has a high molecular weight, a tail gas stream from a second PSA separation zone has a low molecular weight, and when the tail gas stream from the first PSA separation zone has a low molecular weight, the tail gas stream from the second PSA separation zone has a high molecular weight.

The process may include compressing the net tail gas stream in a compression zone having at least one compressor.

Additional aspects, embodiments, and details of the invention, all of which may be combinable in any manner, are set forth in the following detailed description of the invention.

DETAILED DESCRIPTION OF THE DRAWINGS

Figure 2:
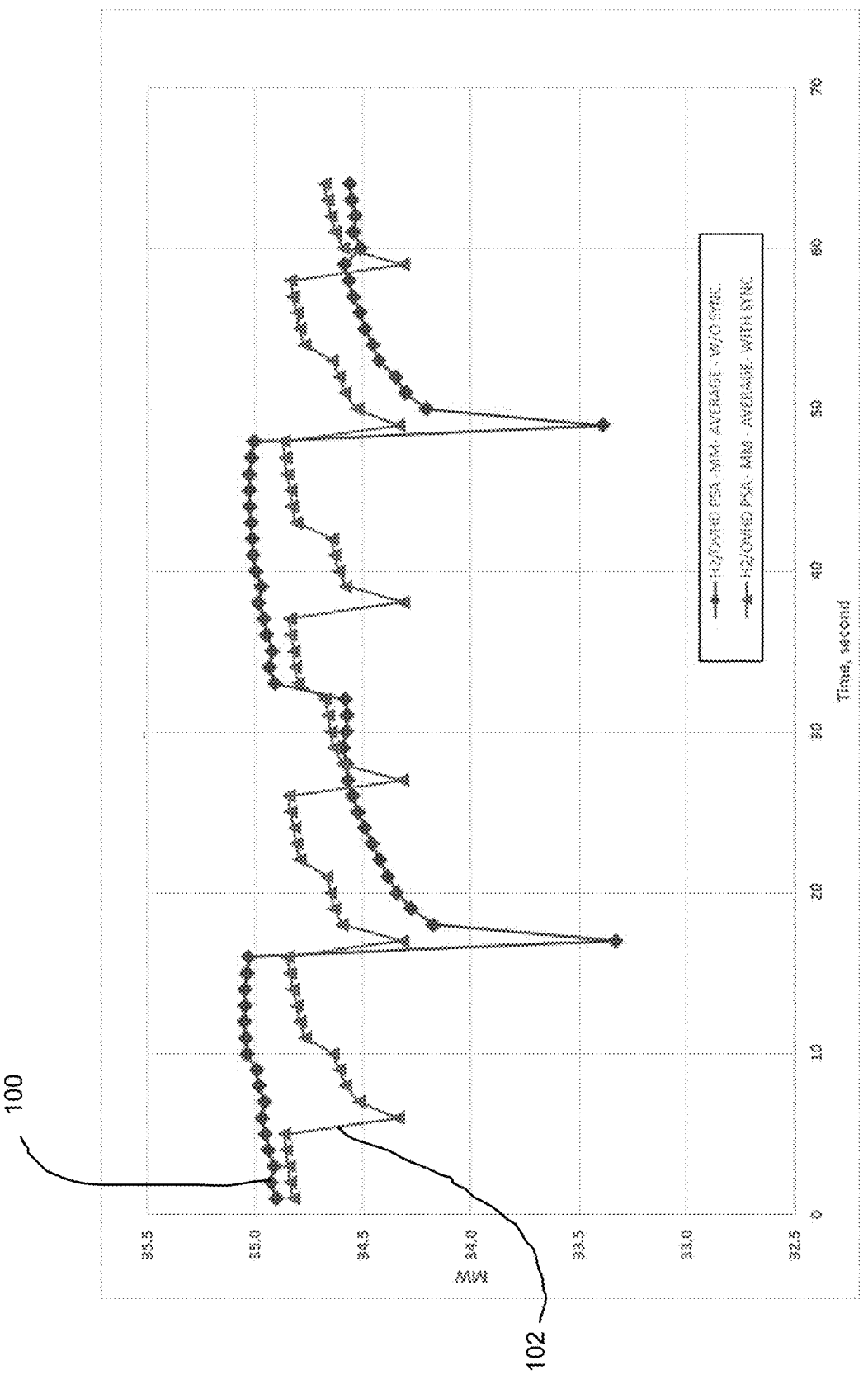

One or more exemplary embodiments of the present invention will be described below in conjunction with the following drawing figures, in which:

FIG. 1 shows a process flow diagram of a plurality of PSA units according to one or more aspects of the present invention; and, FIG. 2 shows a graph comparing molecular weight fluctuation of a combined PSA tail gas stream in a conventional process and in a process according to one or more aspects of the present invention.

DETAILED DESCRIPTION OF THE INVENTION

As mentioned above, processes which reduce the fluctuation of molecular weight of a PSA tail gas have been invented. According to the present processes, the cycle times of multiple PSA units, or trains, are synchronized, preferably automatically, to maintain a suitable offset between cycle time reference points among PSA trains, thus dampen the fluctuation. At a given time, when one of the PSA units is generating a low molecular weight tail gas, there is another PSA unit generating a high molecular weight tail gas. By synchronizing and combining the two tail gases, the molecular weight fluctuation in the combined stream is thus dampened. While prior processes might have an unintended overlap of stages, the present synchronization has a significant and surprising reduction in the fluctuation of the molecular weight of the tail gas.

With these general principles in mind, one or more embodiments of the present invention will be described with the understanding that the following description is not intended to be limiting.

As shown in FIG. 1, the present processes relate to processes and apparatus which utilize multiple PSA units, or separation zones, 10a, 10b, 10c, 10d. As used herein, the term "zone" refers to an area including one or more equipment items and/or one or more sub-zones. Equipment items can include one or more reactors or reactor vessels, scrubbers, strippers, fractionators or distillation columns, absorbers or absorber vessels, regenerators, heaters, exchangers, coolers/chillers, pipes, pumps, compressors, valves, controllers, and the like. Additionally, an equipment item can further include one or more zones or sub-zones.

In the depicted embodiment, four PSA separation zones 10a, 10b, 10c, 10d. This is merely exemplary. Additionally, the PSA separation zones 10a, 10b, 10c, 10d may configured the same or they may be different. For example, three of the separation zones 10a, 10b, 10c by may produce hydrogen product steams, and a fourth PSA separation zone 10d may be an overhead PSA separation zone which produces a feed steam for a membrane separation zone (which may produce a hydrogen product stream).

As is known, each PSA separation zone 10a, 10b, 10c, 10d includes a plurality of fixed-bed adsorption vessels each containing layers of an adsorbent. The vessels may be filled with different layers of materials, for example, lower layers may be filled with weaker adsorbent materials, e.g., relatively low affinity for adsorbing gaseous hydrocarbons, and upper layers may be filled with stronger adsorbent materials, e.g., relatively high affinity for adsorbing gaseous hydrocarbons. For example, the lower layer(s) can contain weakly adsorbent materials, such as activated alumina and/or silica gel, while the intermediate layer(s) can contain intermediate strength adsorbent materials, such as activated carbon, and the upper layer(s) can contain strong adsorbent materials, such as zeolite and/or molecular sieve materials.

As is known, a multicomponent feed gas comprising, for example, hydrogen, hydrocarbons, and carbon dioxide is passed to a vessel in the PSA separation zone whereby impurities are adsorbed onto the adsorbent and a product, such as a hydrogen product, is recovered. Pressure increases as loading increases in the adsorber vessel. Once the adsorbent is saturated with impurities, the adsorption step is discontinued. Pressure is equalized by passing the product/hydrogen stream over to one or more adsorber vessels via co-current depressurization and purging of the adsorber vessel. Pressure is decreased in the adsorber vessel via counter-current depressurization or blowdown. This step removes the impurities from the adsorber vessel. The adsorber vessel is purged using co-current depressurization with another adsorber vessel. The product from the blow down and the purge stages is tail gas.

Thus, the vessels within each PSA separation zone 10a, 10b, 10c, 10d operate in a staggered sequence to produce product and tail gas by cycling through a plurality of steps that includes an adsorption step, a co-current depressurization step, a counter-current depressurization step, a purge step, and a repressurization step. The co-current depressurization, counter-current depressurization and purge steps decrease the pressure in the fixed-bed adsorption unit and purge the unit with high purity gas from the product or co-current depressurization steps, respectively, to remove the hydrocarbons and carbon dioxide and regenerate the adsorption materials. The repressurization step increases the pressure in the fixed-bed adsorption unit with either feed gas or product gas in preparation for the next adsorption step.

The off-gas or tail gas stream 12a, 12b, 12c, 12d from each PSA separation zone 10a, 10b, 10c, 10d have a varying average molecular weight. Traditionally, a surge tank or drum (not shown) may be utilized to dampen fluctuations caused by the cyclic nature of the process and provide mixing of the various tail gas streams 12a, 12b, 12c, 12d produced by each PSA separation zone 10a, 10b, 10c, 10d and provide a combined tail gas stream 12 that is passed to a compression zone 14 having one or more compressors. While the invention is contemplated to be utilized with any type of compressors in the compression zone 14, newer, centrifugal compressors are particularly susceptible to molecular weight fluctuations.

As discussed above, the two PSA steps that produce tail gas are blowdown and purge. Blowdown starts with a relatively low molecular weight and as the pressure reduces in the adsorber the molecular weight increases until the end of blowdown. The purge step operates in the reverse, molecular weight starts high and reduces throughout the step as the vessel reaches maximum regeneration for the cycle. Whenever an PSA separation zone 10a, 10b, 10c, 10d starts blowdown or ends purge there is a step change in the molecular weight of the gas produced by the PSA separation zone 10a, 10b, 10c, 10d. The surge tank or drum does not achieve ideal mixing and reducing of molecular weight fluctuations to effectively and efficiently address this issue. However, the present invention contemplates providing a surge drum to further dampen the molecular weight fluctuations.

To reduce the fluctuations, the present invention synchronizes the steps of one or more first PSA separation zones 10a, 10b, 10c, 10d with the steps of one or more second PSA separation zones 10a, 10b, 10c, 10d so that when a tail gas stream 12a, 12b, 12c, 12d from the first PSA separation zone(s) 10a, 10b, 10c, 10d has a high molecular weight, a second tail gas stream 12a, 12b, 12c, 12d from the second PSA separation zone(s) 10a, 10b, 10c, 10d has a low molecular weight. Additionally, and/or alternatively, the first steps are also synchronized with the second of steps so that when the first tail gas stream 12a, 12b, 12c, 12d has a low molecular weight, the second tail gas stream 12a, 12b, 12c, 12d has a high molecular weight.

A controller 16 may synchronize the steps by sending a signal to a second PSA separation zone 10a, 10b, 10c, 10d. The controller 16 may or may not be associated with one or the PSA separation zone 10a, 10b, 10c, 10d. The controller 16 may be a master controller which communications with controllers associated with each of the PSA separation zone 10a, 10b, 10c, 10d. Further, the master controller may be a controller for one of the PSA separation zone 10a, 10b, 10c, 10d.

Additionally, the signal may be sent to a controller associated with the second PSA separation zone 10a, 10b, 10c, 10d or it may directly instruct the second PSA separation zone 10a, 10b, 10c, 10d. The signal may relate to a current step a vessel of the first PSA separation zone 10a, 10b, 10c, 10d. The signal may relate to a future step a vessel of the PSA separation zone 10a, 10b, 10c, 10d. The signal may be an instruction for the second PSA separation zone 10a, 10b, 10c, 10d to start a vessel of on a specific step.

By synchronizing the various PSA separation zone 10a, 10b, 10c, 10d, the molecular weight fluctuations in the combined tail gas stream 12 is reduced.

Experiments

The examples included hereinafter illustrating the molecular weight variation in the PSA tail gas is generated using an in-house proprietary software package that solves the heat, mass, and momentum balance equation in an adsorption bed.

In FIG. 2, the expected molecular weight fluctuations from a system having three hydrogen PSA separation zones is depicted.

In the simulation based on conventional operations 100, without any synchronization, the expected molecular weight fluctuation ranges from 33.3 to 35.1. This is a range of 1.8, or +/− of 3.5%.

In the simulation based on the present invention 102, with synchronization, the expected molecular weight fluctuation ranges from 34.3 to 34.8. This is a range of 0.5, or +/− of 1.0%. Thus, there is an improvement of three times from conventional processes as a result of synchronizing the various PSA separation zone so that when one of the PSA units is generating a low molecular weight tail gas, there is another PSA unit generating a high molecular weight tail gas.

Specific Embodiments

While the following is described in conjunction with specific embodiments, it will be understood that this description is intended to illustrate and not limit the scope of the preceding description and the appended claim.

A first embodiment of the invention is a method for reducing molecular weight fluctuation in a tail gas stream from a pressure swing adsorption process, the method comprising providing a first PSA separation zone comprising a plurality of vessels each containing an adsorbent configured to adsorb a species from a multi-component feed and provide a product stream, and a first tail gas stream by cycling through a first plurality of steps, wherein a molecular weight of the first tail gas stream fluctuates between a high molecular weight and a low molecular weight; providing a second PSA separation zone a second plurality of vessels each containing an adsorbent configured to adsorb a species from a multi-component feed and provide a product stream, and a second tail gas stream by cycling through a second plurality of steps, wherein a molecular weight of the second tail gas stream fluctuates between a high molecular weight and a low molecular weight; synchronizing the first plurality of steps with the second plurality of steps so that when the first tail gas stream has a high molecular weight, the second tail gas stream has a low molecular weight. An embodiment of the invention is one, any or all of prior embodiments in this paragraph up through the first embodiment in this paragraph, wherein the first plurality of steps are synchronized with the second plurality of steps so that when the first tail gas stream has a low molecular weight, the second tail gas stream has a high molecular weight. An embodiment of the invention is one, any or all of prior embodiments in this paragraph up through the first embodiment in this paragraph, wherein the synchronizing comprises a controller for the first PSA separation zone sending a signal to a controller for a second PSA separation zone. An embodiment of the invention is one, any or all of prior embodiments in this paragraph up through the first embodiment in this paragraph, wherein the signal relates to a current step a vessel of the first PSA separation zone. An embodiment of the invention is one, any or all of prior embodiments in this paragraph up through the first embodiment in this paragraph, wherein the signal relates to a future step a vessel of the first PSA separation zone. An embodiment of the invention is one, any or all of prior embodiments in this paragraph up through the first embodiment in this paragraph, wherein the signal comprises an instruction for the second PSA separation zone to start a vessel of on a specific step. An embodiment of the invention is one, any or all of prior embodiments in this paragraph up through the first embodiment in this paragraph, wherein the first and second plurality of steps both comprise an adsorption step, a co-current depressurization step, a counter-current depressurization step, a purge step, and a repressurization step. An embodiment of the invention is one, any or all of prior embodiments in this paragraph up through the first embodiment in this paragraph, further comprising combining the first tail gas stream and the second tail gas stream to provide a net tail gas stream. An embodiment of the invention is one, any or all of prior embodiments in this paragraph up through the first embodiment in this paragraph, further comprising compressing the net tail gas stream in a compression zone. An embodiment of the invention is one, any or all of prior embodiments in this paragraph up through the first embodiment in this paragraph, wherein the compression zone has at least one compressor.

A second embodiment of the invention is a method for reducing molecular weight fluctuation in a tail gas stream from a pressure swing adsorption process, the method comprising operating a plurality of PSA separation zones to adsorb a species from a multi-component feed, wherein each PSA separation zone comprises a plurality of vessels each containing an adsorbent configured by cycling through a plurality of steps, wherein each PSA separation zone provides a product stream and a tail gas stream, and wherein a molecular weight of the tail gas stream fluctuates between a high molecular weight and a low molecular weight; combining the tail gas streams from each PSA separation zone to form a net tail gas stream; and controlling each PSA separation zone such that when a tail gas stream from a first PSA separation zone has a high molecular weight, a tail gas stream from a second PSA separation zone has a low molecular weight. An embodiment of the invention is one, any or all of prior embodiments in this paragraph up through the second embodiment in this paragraph, wherein the controlling comprises a controller for the first PSA separation zone sending a signal to a controller for the second PSA separation zone. An embodiment of the invention is one, any or all of prior embodiments in this paragraph up through the second embodiment in this paragraph, wherein the signal relates to a current step a vessel of the first PSA separation zone. An embodiment of the invention is one, any or all of prior embodiments in this paragraph up through the second embodiment in this paragraph, wherein the signal relates to a future step a vessel of the first PSA separation zone. An embodiment of the invention is one, any or all of prior embodiments in this paragraph up through the second embodiment in this paragraph, wherein the signal comprises an instruction for the second PSA separation zone to start a vessel on a specific step. An embodiment of the invention is one, any or all of prior embodiments in this paragraph up through the second embodiment in this paragraph, wherein the plurality of steps comprise an adsorption step, a co-current depressurization step, a counter-current depressurization step, a purge step, and a repressurization step. An embodiment of the invention is one, any or all of prior embodiments in this paragraph up through the second embodiment in this paragraph, further comprising compressing the net tail gas stream in a compression zone. An embodiment of the invention is one, any or all of prior embodiments in this paragraph up through the second embodiment in this paragraph, wherein the compression zone has at least one compressor.

A third embodiment of the invention is a method for reducing molecular weight fluctuation in a tail gas stream from a pressure swing adsorption process, the method comprising operating a plurality of PSA separation zones to adsorb a species from a multi-component feed, wherein each PSA separation zone comprises a plurality of vessels each containing an adsorbent configured by cycling through a plurality of steps, wherein each PSA separation zone provides a product stream and a tail gas stream, and wherein a molecular weight of the tail gas stream fluctuates between a high molecular weight and a low molecular weight, and wherein the plurality of steps comprise an adsorption step, a co-current depressurization step, a counter-current depressurization step, a purge step, and a repressurization step; combining the tail gas streams from each PSA separation zone to form a net tail gas stream; and controlling each PSA separation zone such that when a tail gas stream from a first PSA separation zone has a high molecular weight, a tail gas stream from a second PSA separation zone has a low molecular weight, and when the tail gas stream from the first PSA separation zone has a low molecular weight, the tail gas stream from the second PSA separation zone has a high molecular weight. An embodiment of the invention is one, any or all of prior embodiments in this paragraph up through the third embodiment in this paragraph, further comprising compressing the net tail gas stream in a compression zone, wherein the compression zone has at least one compressor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for reducing molecular weight fluctuation in a tail gas stream from a pressure swing adsorption process, the method comprising:

providing a first PSA separation zone comprising a plurality of vessels each containing an adsorbent configured to adsorb a species from a multi-component feed and provide a product stream, and a first tail gas stream by cycling through a first plurality of steps, wherein a molecular weight of the first tail gas stream fluctuates between a relatively high molecular weight and a relatively low molecular weight;

providing a second PSA separation zone a second plurality of vessels each containing an adsorbent configured to adsorb a species from a multi-component feed and provide a product stream, and a second tail gas stream by cycling through a second plurality of steps, wherein a molecular weight of the second tail gas stream fluctuates between a relatively high molecular weight and a relatively low molecular weight;

synchronizing the first plurality of steps with the second plurality of steps so that when the first tail gas stream has the high molecular weight, the second tail gas stream has the low molecular weight.

2. The method of claim 1, wherein the first plurality of steps are synchronized with the second plurality of steps so that when the first tail gas stream has the low molecular weight, the second tail gas stream has the high molecular weight.

3. The method of claim 1, wherein the synchronizing comprises: a controller for the first PSA separation zone sending a signal to a controller for a second PSA separation zone.

4. The method of claim 3, wherein the signal relates to a current step of the first PSA separation zone.

5. The method of claim 3, wherein the signal relates to a future step of the first PSA separation zone.

6. The method of claim 3, wherein the signal comprises an instruction for the second PSA separation zone to start a vessel on a specific step.

7. The method of claim 1, wherein the first and second plurality of steps both comprise: an adsorption step, a co-current depressurization step, a counter-current depressurization step, a purge step, and a repressurization step.

8. The method of claim 1, further comprising:
combining the first tail gas stream and the second tail gas stream to provide a net tail gas stream.

9. The method of claim 8, further comprising:
compressing the net tail gas stream in a compression zone.

10. The method of claim 9, wherein the compression zone has at least one compressor.

11. A method for reducing molecular weight fluctuation in a tail gas stream from a pressure swing adsorption process, the method comprising:

operating a plurality of PSA separation zones to adsorb a species from a multi-component feed, wherein each PSA separation zone comprises a plurality of vessels each containing an adsorbent configured by cycling through a plurality of steps, wherein each PSA separation zone provides a product stream and a tail gas stream, and wherein a molecular weight of each tail gas stream fluctuates between a relatively high molecular weight and a relatively low molecular weight;

combining the tail gas streams from each PSA separation zone to form a net tail gas stream; and controlling each PSA separation zone such that when a tail gas stream from a first PSA separation zone has the high molecular weight, a tail gas stream from a second PSA separation zone has the low molecular weight.

12. The method of claim 11, wherein the controlling comprises: a controller for the first PSA separation zone sending a signal to a controller for the second PSA separation zone.

13. The method of claim 12, wherein the signal relates to a current step of the first PSA separation zone.

14. The method of claim 12, wherein the signal relates to a future step of the first PSA separation zone.

15. The method of claim 12, wherein the signal comprises an instruction for the second PSA separation zone to start a vessel on a specific step.

16. The method of claim 11, wherein the plurality of steps comprise: an adsorption step, a co-current depressurization step, a counter-current depressurization step, a purge step, and a repressurization step.

17. The method of claim 11, further comprising:
compressing the net tail gas stream in a compression zone.

18. The method of claim 17, wherein the compression zone has at least one compressor.

19. A method for reducing molecular weight fluctuation in a tail gas stream from a pressure swing adsorption process, the method comprising:

operating a plurality of PSA separation zones to adsorb a species from a multi-component feed, wherein each PSA separation zone comprises a plurality of vessels each containing an adsorbent configured by cycling through a plurality of steps, wherein each PSA separation zone provides a product stream and a tail gas stream, and wherein a molecular weight of each tail gas stream fluctuates between a relatively high molecular weight and a relatively low molecular weight, and wherein the plurality of steps comprise: an adsorption step, a co-current depressurization step, a counter-current depressurization step, a purge step, and a repressurization step;

combining the tail gas streams from each PSA separation zone to form a net tail gas stream; and controlling each PSA separation zone such that when a tail gas stream from a first PSA separation zone has the high molecular weight, a tail gas stream from a second PSA separation zone has the low molecular weight, and when the tail gas stream from the first PSA separation zone has the low molecular weight, the tail gas stream from the second PSA separation zone has the high molecular weight.

20. The method of claim 19, further comprising:
compressing the net tail gas stream in a compression zone, wherein the compression zone has at least one compressor.

* * * * *